United States Patent
Utsunomiya et al.

(10) Patent No.: US 11,757,103 B2
(45) Date of Patent: Sep. 12, 2023

(54) GAS DIFFUSION ELECTRODE MEDIUM AND METHOD FOR PRODUCING THE SAME, GAS DIFFUSION ELECTRODE, MEMBRANE ELECTRODE ASSEMBLY, AND POLYMER ELECTROLYTE FUEL CELL

(71) Applicant: TORAY INDUSTRIES, INC., Tokyo (JP)

(72) Inventors: Masamichi Utsunomiya, Otsu (JP); Satoru Shimoyama, Otsu (JP); Fumitaka Watanabe, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 160 days.

(21) Appl. No.: 17/602,054

(22) PCT Filed: Mar. 16, 2020

(86) PCT No.: PCT/JP2020/011370
§ 371 (c)(1),
(2) Date: Oct. 7, 2021

(87) PCT Pub. No.: WO2020/213324
PCT Pub. Date: Oct. 22, 2020

(65) Prior Publication Data
US 2022/0200012 A1    Jun. 23, 2022

(30) Foreign Application Priority Data

Apr. 19, 2019 (JP) ................. 2019-079913

(51) Int. Cl.
*H01M 4/88* (2006.01)
*H01M 4/86* (2006.01)
*H01M 4/92* (2006.01)
*H01M 8/1004* (2016.01)
*D04H 1/49* (2012.01)
*D04H 1/54* (2012.01)
*D04H 1/4242* (2012.01)
*H01M 8/1018* (2016.01)

(52) U.S. Cl.
CPC ........ *H01M 4/8807* (2013.01); *D04H 1/4242* (2013.01); *D04H 1/49* (2013.01); *D04H 1/54* (2013.01); *H01M 4/8657* (2013.01); *H01M 4/8882* (2013.01); *H01M 4/8896* (2013.01); *H01M 4/926* (2013.01); *H01M 8/1004* (2013.01); *H01M 8/1018* (2013.01)

(58) Field of Classification Search
CPC .................................................. D04H 1/4242
See application file for complete search history.

(56) References Cited

U.S. PATENT DOCUMENTS

| | | | |
|---|---|---|---|
| 2003/0027471 | A1 | 2/2003 | Shimazaki et al. |
| 2006/0166075 | A1 | 7/2006 | Inoue et al. |
| 2006/0180798 | A1 | 8/2006 | Chida et al. |
| 2008/0075940 | A1 | 3/2008 | Schafer et al. |
| 2016/0322646 | A1* | 11/2016 | Kajiwara ............ H01M 8/0234 |
| 2018/0145335 | A1* | 5/2018 | Kajiwara ............... D06C 23/00 |
| 2019/0165379 | A1* | 5/2019 | Kajiwara ............... D04H 1/495 |

FOREIGN PATENT DOCUMENTS

| | | |
|---|---|---|
| JP | 2004-27435 A | 1/2004 |
| JP | 2004-511672 A | 4/2004 |
| JP | 2004-308098 A | 11/2004 |
| JP | 2011-195374 A | 10/2011 |
| JP | 2018-84010 A | 5/2018 |
| WO | WO 02/42534 A1 | 5/2002 |
| WO | WO 2004/031465 A1 | 4/2004 |

OTHER PUBLICATIONS

International Search Report, issued in PCT/JP2020/011370, dated Jun. 9, 2020.
Written Opinion of the International Searching Authority, issued in PCT/JP2020/011370, dated Jun. 9, 2020.
Extended European Search Report for European Application No. 20791811.1, dated Dec. 7, 2022.

* cited by examiner

*Primary Examiner* — Jonathan Crepeau
(74) *Attorney, Agent, or Firm* — Birch, Stewart, Kolasch & Birch, LLP

(57) ABSTRACT

In order to provide a gas diffusion electrode medium having high thermal conductivity despite having low density and excellent both in handleability and cell performance, provided is a gas diffusion electrode medium including carbon fiber felt including carbon fibers having an average fiber diameter of 5 to 20 μm, wherein at least a part of the carbon fibers that constitute the carbon fiber felt have a flat part in which, in a plane view of a surface of the carbon fiber felt, a maximum value of a fiber diameter is observed to be 10 to 50% larger than the average fiber diameter, and a frequency of the flat parts at the surface of the carbon fiber felt is 50 to 200/mm².

15 Claims, No Drawings

GAS DIFFUSION ELECTRODE MEDIUM AND METHOD FOR PRODUCING THE SAME, GAS DIFFUSION ELECTRODE, MEMBRANE ELECTRODE ASSEMBLY, AND POLYMER ELECTROLYTE FUEL CELL

TECHNICAL FIELD

The present invention relates to a gas diffusion electrode medium mainly used in a polymer electrolyte fuel cell, and a method for producing the gas diffusion electrode medium.

BACKGROUND ART

Polymer electrolyte fuel cells are expected to be widely used as clean energy because they have high energy efficiency and discharge only water during operation.

The polymer electrolyte fuel cell includes, as a basic configuration, a polymer electrolyte membrane, a catalyst layer formed on both surfaces of the polymer electrolyte membrane, a gas diffusion electrode medium formed outside of each of the catalyst layers, and two bipolar plates sandwiching the gas diffusion electrode media.

A fuel cell is a system for electrically extracting energy generated when hydrogen and oxygen supplied from bipolar plates react with each other in catalyst layers to produce water. Therefore, when the electrical load on the fuel cell increases, that is, when the current taken out to the outside of the fuel cell is increased, a large amount of water (water vapor) and heat are generated. When the water vapor condenses into water droplets at a low temperature which block the pores of the gas diffusion electrode media, the amount of gas (oxygen or hydrogen) supplied to the catalyst layers decreases. When all the pores are finally blocked by water, power generation is stopped (this phenomenon is referred to as flooding). Moreover, there is known a problem that when the fuel cell is operated at a relatively high temperature of 80° C. or more, the electrolyte membrane is dried due to diffusion of water vapor, so that proton conductivity is lowered, and as a result, cell performance is deteriorated (this phenomenon is referred to as dry out). Many attempts have been made to solve these problems.

As a gas diffusion electrode medium, specifically, carbon paper is widely used. Carbon paper is obtained by forming carbon fibers cut short into a sheet by a papermaking method, fixing the sheet with a binding resin, and then carbonizing and graphitizing the sheet. Furthermore, attempts have been made for improving water drainage by a method of subjecting carbon paper to a water repellent treatment with a fluoropolymer or the like, or a method of forming a microporous layer containing a fluoropolymer and carbon particles on carbon paper. For example, Patent Document 1 discloses carbon paper having high thermal conductivity, the carbon paper including carbon fibers bonded with a binding resin.

As another approach for improving the drainage performance of the gas diffusion electrode medium, it has been studied to use, as the gas diffusion electrode medium, carbon fiber felt in which carbon fibers are entangled with each other instead of being formed into a sheet by a papermaking method. For example, Patent Document 2 discloses a gas diffusion electrode medium obtained by entangling flame resistant fibers with each other and calendar-pressing the fibers to fix the form of the fibers. The gas diffusion electrode medium contains a significantly reduced amount of binding resin used for fixing, and has improved gas diffusivity and drainage performance.

PRIOR ART DOCUMENTS

Patent Documents

Patent Document 1: Japanese Patent Laid-open Publication No. 2011-195374
Patent Document 2: Japanese Unexamined Patent Application Publication No. 2004-511672

SUMMARY OF THE INVENTION

Problems to be Solved by the Invention

Although the carbon paper of Patent Document 1, in which carbon fibers are bonded with a binding resin, has improved thermal conductivity, the carbon paper has a problem in handleability due to its high density and hardness.

Meanwhile, although the carbon fiber felt of Patent Document 2, in which the binding resin used for fixing is significantly reduced, has improved handleability, the carbon fiber felt has a problem of low thermal conductivity because only a small number of carbon fibers are bonded.

Therefore, an object of the present invention is to provide a gas diffusion electrode medium having high thermal conductivity despite having low density and excellent both in handleability and cell performance.

Solutions to the Problems

In order to solve the above-mentioned problems, the present invention provides a gas diffusion electrode medium including carbon fiber felt including carbon fibers having an average fiber diameter of 5 to 20 μm, wherein at least a part of the carbon fibers that constitute the carbon fiber felt have a flat part in which, in a plane view of a surface of the carbon fiber felt, a maximum value of a fiber diameter is observed to be 10 to 50% larger than the average fiber diameter, and a frequency of the flat parts at the surface of the carbon fiber felt is 50 to 200/mm$^2$.

The present invention also provides a method for producing a gas diffusion electrode medium, the method including:

step A: a step of entangling, by water flow, flame resistant fibers having a specific gravity of 1.30 to 1.36 g/cm$^3$ and a fineness of 0.5 to 2.2 dtex to produce flame resistant fiber felt having a moisture content of 20 to 60%;

step B: a step of heating and pressurizing the flame resistant fiber felt obtained in step A at a surface pressure of 2 to 10 MPa and at 240 to 300° C.; and step C: a step of carbonizing the flame resistant fiber felt pressurized in step B to produce carbon fiber felt.

Effects of the Invention

According to the present invention, it is possible to provide a gas diffusion electrode medium having high thermal conductivity despite having low density and excellent both in handleability and cell performance. The gas diffusion electrode medium is obtained by providing flat parts having a size within a specific range in at least a part of three-dimensionally entangled carbon fibers, and making the flat parts present in a number within a specific range on a surface of carbon fiber felt. Use of such a gas diffusion electrode medium provides a fuel cell excellent in cell performance at high productivity.

EMBODIMENTS OF THE INVENTION

<Gas Diffusion Electrode Medium>

As used herein, the wording "to" in a numerical range means that the range includes boundary values at both ends thereof.

The gas diffusion electrode medium of the present invention includes carbon fiber felt including carbon fibers having an average fiber diameter of 5 to 20 µm. The phrase "the gas diffusion electrode medium includes carbon fiber felt" means that the gas diffusion electrode medium may be made of only the carbon fiber felt, but the gas diffusion electrode medium may be, as described later, additionally modified for enhancing the function as a gas diffusion electrode medium, as in a gas diffusion electrode medium including a water repellent material applied to the carbon fiber felt, or a gas diffusion electrode medium including a microporous layer formed on one surface of the carbon fiber felt.

[Carbon Fiber Felt]

The carbon fiber felt is obtained by heating and carbonizing flame resistant fiber felt in an inert gas atmosphere, and is a sheet-shaped object formed from three-dimensionally entangled carbon fibers.

The carbon fiber felt that constitutes the gas diffusion electrode medium of the present invention preferably includes carbon fibers having a fiber length of 3 mm or more. When the fiber length is 3 mm or more, the carbon fibers are easily oriented in the thickness direction, and the thermal conductivity and electrical conductivity of the gas diffusion electrode medium in the thickness direction thereof can be enhanced. The fiber length of the carbon fibers is more preferably 10 mm or more. The upper limit of the fiber length of the carbon fibers is not particularly limited, but it is generally preferably 100 mm or less. The fiber length as used herein means the number average fiber length.

In the present invention, the carbon fibers that constitute the carbon fiber felt have an average fiber diameter of 5 to 20 µm. The smaller the average fiber diameter of the carbon fibers is, the larger the number of intersections of the fibers is, and thus the carbon fiber felt is excellent in thermal conductivity and electrical conductivity, but is difficult to handle. Therefore, the average fiber diameter of the carbon fibers is more preferably 7 to 14 µm. The average fiber diameter of the carbon fibers can be controlled according to the specific gravity and fineness of the flame resistant fibers used in step A described later. The average fiber diameter of the carbon fibers in the present specification is an average of fiber diameters at 90 points in total, which is obtained by observing a surface of the carbon fiber felt at a magnification of 100 to 1000 with a scanning electron microscope (SEM) in 10 fields of view, and measuring the fiber diameters of the carbon fibers at 9 points per field of view. The observation at 9 points per field of view is performed at the intersections of three lines vertically dividing one field of view into four and three lines horizontally dividing one field of view into four. When there is no carbon fiber on any of the intersections, the fiber diameter of a carbon fiber closest to the intersection is measured. The measurement at the 90 points may include measurement of a flat part described later.

At least a part of the carbon fibers that constitute the carbon fiber felt include a flat part. The flat part in the present specification is a part in which, in the observation of individual carbon fibers in a plane view of a surface of the carbon fiber felt, the fiber diameter is observed to be 10 to 50% larger than the average fiber diameter. When the maximum value of the fiber diameter of the flat part observed in a plane view (hereinafter, the maximum value is referred to as the "thickness of the flat part") is larger than the average fiber diameter by 10% or more, the gas diffusion electrode medium has increased contact area with a bipolar plate in a fuel cell incorporating the gas diffusion electrode medium, and the gas diffusion electrode medium has improved thermal conductivity. When the thickness of the flat part is larger than the average fiber diameter by 50% or less of the average fiber diameter (that is, when the thickness of the flat part is 150% or less of the average fiber diameter), the strength of the carbon fibers does not decrease, and the gas diffusion electrode medium is easily handled. In addition, the gas diffusion path has small tortuosity in the thickness direction, the gas can be easily diffused in the thickness direction, and the cell performance is also improved. The thickness of the flat part is preferably larger than the average fiber diameter by 20 to 40%, and more preferably larger than the average fiber diameter by 25 to 35%.

The thickness of the flat part is measured by measuring, in a plane view of the carbon fiber felt, the width of the carbon fiber in a direction orthogonal to the fiber axis direction of the carbon fiber. A case where the maximum value of the width is larger than the average fiber diameter by 10% or more and 50% or less is counted as a "flat part" in the present invention. When the carbon fiber is not linear but bent, the width of the carbon fiber is measured on the assumption that the width is orthogonal to the tangent of the fiber axis. The flat part can be observed by a scanning electron microscope (SEM) under conditions of a magnification of 100 to 1000 similarly to the measurement of the fiber diameter of the carbon fiber.

In the present invention, the frequency of the flat parts at the surface of the carbon fiber felt is 50 to 200/mm$^2$. When the frequency of the flat parts is 50/mm$^2$ or more, the gas diffusion electrode medium has increased contact area with a bipolar plate making up a fuel cell, and the gas diffusion electrode medium has improved thermal conductivity. When the frequency of the flat parts is 200/mm$^2$ or less, the strength of the carbon fibers does not decrease, and the gas diffusion electrode medium is easily handled. The frequency of the flat parts is preferably 70 to 170/mm$^2$, and more preferably 90 to 140/mm$^2$. The frequency of the flat parts can be determined by measuring the widths of carbon fibers in a direction orthogonal to the fiber axis direction of the carbon fibers in a plane view of the carbon fiber felt, counting the number of flat parts, in each of which the maximum value of the width is larger than the average fiber diameter by 10% or more and 50% or less, and dividing the total number of the flat parts by the measurement area. For example, when two fibers each have the flat part at the intersection between them, the number of the flat parts is counted as two.

The gas diffusion electrode medium preferably has a thermal conductivity of 0.25 to 10 W/(m·K). When the thermal conductivity of the gas diffusion electrode medium is 0.25 W/(m·K) or more, the electrolyte membrane is easily cooled during the operation of the fuel cell, dry out is reduced at a high temperature, and the cell performance is improved. When the thermal conductivity of the gas diffusion electrode medium is 10 W/(m·K) or less, heat generated in the catalyst layer upon power generation of the fuel cell is less likely to be conducted to the bipolar plate. Therefore, the temperature of the catalyst layer increases and the reaction activity increases, so that cell performance at a low temperature is improved. The thermal conductivity of the gas diffusion electrode medium is more preferably 0.35 to 7 W/(m·K), and still more preferably 0.45 to 5 W/(m·K). The thermal conductivity can be measured by a thermal conductivity meter (IE-1230) manufactured by Iwatsu Test Instruments Corp.

The gas diffusion electrode medium preferably has a density of 0.3 to 0.8 g/cm$^3$. When the density of the gas diffusion electrode medium is 0.3 g/cm$^3$ or more, the gas diffusion electrode medium has improved thermal conductivity and increased strength, and is easily handled. When the density of the gas diffusion electrode medium is 0.8 g/cm$^3$ or less, the gas diffusion electrode medium has improved gas diffusivity. The density of the gas diffusion electrode medium is more preferably 0.4 to 0.7 g/cm$^3$, and still more preferably 0.5 to 0.6 g/cm$^3$. The density of the gas diffusion electrode medium is determined by dividing the areal weight by the thickness.

The average pore size of the carbon fiber felt is preferably 20 μm or more, more preferably 25 μm or more, and still more preferably 30 μm or more. The upper limit of the average pore size is not particularly limited, but is preferably 80 μm or less, and more preferably 70 μm or less. An average pore size of 20 μm or more provides high performance in gas diffusion and drainage. An average pore size of 80 μm or less makes it easier to reduce dry out. In the present invention, the average pore size of the carbon fiber felt refers to a value measured by a mercury intrusion method. The average pore size can be measured using, for example, PoreMaster (manufactured by Quantachrome Instruments Japan G.K.). A value obtained by setting the surface tension of mercury to 480 dyn/cm and setting the contact angle between mercury and the carbon fiber felt to 140° is employed as the average pore size.

The thicker the gas diffusion electrode medium is, the larger the fuel cell is. Therefore, the gas diffusion electrode medium is preferably as thin as possible as long as it exhibits its function, and is generally about 30 μm to 500 μm thick. In the present invention, the thickness of the gas diffusion electrode medium is preferably 300 μm or less, more preferably 250 μm or less, and still more preferably 200 μm or less. The thickness of the gas diffusion electrode medium is more preferably 50 μm or more, and still more preferably 70 μm or more. When the thickness of the gas diffusion electrode medium is 50 μm or more, the gas diffusivity in the in-plane direction is further improved, and the supply of the gas to the catalyst under the rib of the bipolar plate is further facilitated. Meanwhile, when the thickness of the gas diffusion electrode medium is 300 μm or less, the gas diffusion path and the drainage path are shortened, so that the electrical conductivity and thermal conductivity can be improved. In the present invention, the thickness of the gas diffusion electrode medium is the thickness measured in a state where an area of 5 mm or more in diameter is pressurized at a surface pressure of 0.15 MPa. Further, the thickness of the gas diffusion electrode medium including the microporous layer described later means the thickness including the thickness of the microporous layer.

[Water Repellent Material]

In order to enhance the drainage performance to the bipolar plate side, it is preferable to apply a water repellent material to the carbon fiber felt. The water repellent material used is preferably a fluorine-based polymer because it is excellent in corrosion resistance. Examples of the fluorine-based polymer include polytetrafluoroethylene (PTFE), a tetrafluoroethylene-hexafluoropropylene copolymer (FEP), and a tetrafluoroethylene-perfluoroalkyl vinyl ether copolymer (PFA). In general, it is determined that a water repellent material is applied to the carbon fiber felt when the contact angle between a 10-μL water droplet placed on the surface of the carbon fiber felt and the carbon fiber felt surface exceeds 120°. Particularly when a fluorine-based polymer is used as a water repellent material, it is confirmed that a fluorine-based polymer as a water repellent material is applied to the carbon fiber felt by confirming the presence of fluorine atoms on the surface of the fibers that constitute the carbon fiber felt through X-ray spectroscopy, or by detecting the fluorocarbon through TG-MS that is a combination of thermogravimetry and mass spectrometry. The content of the water repellent material in the carbon fiber felt is not particularly limited, but it is preferably 1 mass % to 20 mass %, and more preferably 3 mass % to 10 mass % based on the carbon fiber felt.

The carbon fiber felt may further contain an additive other than the water repellent material. For example, carbon fiber felt containing electrically conductive carbon particles in addition to the water repellent material is a preferable aspect since both the water repellency and electrical conductivity can be achieved. Examples of the electrically conductive carbon particles contained in the carbon fiber felt include carbon blacks such as furnace black, acetylene black, lamp black, and thermal black, graphites such as scale-like graphite, vein graphite, amorphous graphite, synthetic graphite, expandable graphite, and flake graphite, and linear carbon materials such as vapor grown carbon fibers, single-wall carbon nanotubes, double-wall carbon nanotubes, multi-wall carbon nanotubes, carbon nanohorns, carbon nanocoils, cup stacked carbon nanotubes, bamboo-shaped carbon nanotubes, and graphite nanofibers. Above all, it is more preferable that the carbon fiber felt contain graphite such as scale-like graphite, vein graphite, amorphous graphite, synthetic graphite, expandable graphite, and flake graphite. When the carbon fiber felt contains graphite, the gas diffusion electrode medium has improved thermal conductivity, and the cell performance at a high temperature is improved.

[Microporous Layer]

The gas diffusion electrode medium of the present invention may have a microporous layer provided on one surface of the carbon fiber felt. In this case, the flat parts are observed in a plane view of another surface of the carbon fiber felt on which the microporous layer is not provided.

The microporous layer is a layer having pores having a pore size smaller than that of pores in the carbon fiber felt. The microporous layer is a layer containing carbon particles and a water repellent material, and formed at a surface of the gas diffusion electrode medium in contact with the catalyst layer. In general, the average pore size of the carbon fiber felt is larger than 1 μm. Therefore, the average pore size of the microporous layer is preferably smaller than 1 μm. The microporous layer can promote drainage of water from space between the catalyst layer and the carbon fiber felt to reduce flooding, and can promote reverse diffusion of water into the electrolyte membrane to reduce dry out.

Examples of the carbon particles contained in the microporous layer include carbon blacks such as furnace black, acetylene black, lamp black, and thermal black, graphites such as scale-like graphite, vein graphite, amorphous graphite, synthetic graphite, expandable graphite, and flake graphite, and linear carbon materials such as vapor grown carbon fibers, single-wall carbon nanotubes, double-wall carbon nanotubes, multi-wall carbon nanotubes, carbon nanohorns, carbon nanocoils, cup stacked carbon nanotubes, bamboo-shaped carbon nanotubes, and graphite nanofibers. It is more preferable that the microporous layer contain graphite such as scale-like graphite, vein graphite, amorphous graphite, synthetic graphite, expandable graphite, and flake graphite as carbon particles that constitute the microporous layer. When the microporous layer contains graphite, the gas diffusion electrode medium has improved thermal conductivity, and the cell performance at a high temperature is improved.

The water repellent material contained in the microporous layer is preferably a fluorine-based polymer having high corrosion resistance. Examples of the fluorine-based polymer include polytetrafluoroethylene (PTFE), a tetrafluoroethylene-hexafluoropropylene copolymer (FEP), and a tetrafluoroethylene-perfluoroalkyl vinyl ether copolymer (PFA).

The porosity of the microporous layer is preferably in the range of 60 to 85%, more preferably in the range of 65 to 80%, and still more preferably in the range of 70 to 75%. When the porosity is 60% or more, the drainage performance is further improved, and the flooding can be further reduced. When the porosity is 85% or less, the water vapor diffusivity is lower, and the dry out can be further reduced. Herein, the porosity of the microporous layer is measured using a sample for sectional observation obtained using an ion beam section processing apparatus by taking a photograph of the section at a magnification of 1000 or more using a microscope such as a scanning electron microscope, measuring the area of the pores, and calculating the area ratio of the pores to the observed area.

The areal weight of the microporous layer is preferably in the range of 10 to 35 $g/m^2$. When the areal weight of the microporous layer is 10 $g/m^2$ or more, the microporous layer can reliably cover the surface of the carbon fiber felt, and the reverse diffusion of the produced water is promoted. When the areal weight of the microporous layer is 35 $g/m^2$ or less, blocking of the pores is reduced, and the drainage performance is further improved. The areal weight of the microporous layer is more preferably 30 $g/m^2$ or less, and still more preferably 25 $g/m^2$ or less. The areal weight is more preferably 14 $g/m^2$ or more, and still more preferably 16 $g/m^2$ or more.

The gas diffusion electrode medium preferably has a fluorine/carbon element ratio of 0.10 to 0.15 at a surface of the gas diffusion electrode medium on a microporous layer side, and preferably has a fluorine/carbon element ratio of less than 0.10 at another surface (surface not having the microporous layer) of the gas diffusion electrode medium. When the fluorine/carbon element ratio at the surface on the microporous layer side is larger than that at the other surface, water generated by power generation is easily drained to the bipolar plate side, flooding is reduced, and the cell performance is improved. When the fluorine/carbon element ratio is small at both the surface on the microporous layer side and the other surface, the gas diffusion electrode medium has improved thermal conductivity, dry out is reduced, and cell performance at a high temperature is improved. Therefore, the fluorine/carbon element ratio at the surface on the microporous layer side is more preferably 0.11 to 0.14, and still more preferably 0.12 to 0.13. In addition, the fluorine/carbon element ratio at the other surface of the gas diffusion electrode medium is more preferably less than 0.08, and still more preferably less than 0.06. Although the fluorine/carbon element ratio at the other surface of the gas diffusion electrode medium is preferably small as described above, the fluorine/carbon element ratio is preferably larger than 0.03 in order to produce a gas diffusion electrode medium having high drainage performance. The fluorine/carbon element ratio is obtained as follows: 10 or more points at the surface of the gas diffusion electrode medium are subjected to scanning electron microscope (SEM)-EDX measurement under the conditions of an accelerating voltage of 20 kV and a magnification of 2000, and the average of the 10 or more values is used as the fluorine/carbon element ratio. The scanning electron microscope being used may be an apparatus such as S-5500 manufactured by Hitachi, Ltd., and the energy dispersive X-ray analyzer being used may be an apparatus such as EX-220SE manufactured by HORIBA, Ltd.

A surface of the microporous layer preferably has a glossiness of 31 or more. The glossiness of the microporous layer is an index of surface smoothness. When the surface has a high glossiness, adhesion between the microporous layer and the catalyst layer is improved, thermal resistance between the catalyst layer and the gas diffusion electrode medium is reduced, and dry out of the electrolyte membrane is reduced at a high temperature. The glossiness of the microporous layer is more preferably 35 or more, and still more preferably 40 or more. The glossiness of the microporous layer can be measured by a glossmeter installed on the surface of the gas diffusion electrode medium on the microporous layer side. The glossmeter being used may be, for example, a mobile specular glossiness measuring device "Gloss Mobile GM-1" (manufactured by Suga Test Instruments Co., Ltd.). The measurement standard is in accordance with JIS Z 8741:1997 "Specular glossiness-Methods of measurement". In the present specification, the glossiness is measured at 3 different points in the surface of the microporous layer, and the average of the numerical values obtained when the reflection angle is 85° is taken as the glossiness.

<Gas Diffusion Electrode, Membrane Electrode Assembly, and Polymer Electrolyte Fuel Cell>

A gas diffusion electrode can be formed by providing a catalyst layer on a surface of the gas diffusion electrode medium of the present invention. It is preferable that the catalyst layer contain, as a catalyst, carbon particles carrying a transition metal, particularly platinum or an alloy thereof on the surface thereof. When the gas diffusion electrode medium has the microporous layer, the catalyst layer is formed on a surface of the microporous layer.

Moreover, a membrane electrode assembly can be obtained by (i) forming a catalyst layer on both sides of a polymer electrolyte membrane, and further disposing and bonding the gas diffusion electrode medium of the present invention on the outer sides of the catalyst layers, or (ii) disposing and bonding a gas diffusion electrode, which is obtained by forming a catalyst layer on the gas diffusion electrode medium of the present invention, on both sides of a polymer electrolyte membrane. Further, a cell of a polymer electrolyte fuel cell can be obtained by disposing a bipolar plate on both sides of the membrane electrode assembly.

<Method for Producing Gas Diffusion Electrode Medium>

In an example, the gas diffusion electrode medium of the present invention is produced by a method including:

step A: a step of entangling, by water flow, flame resistant fibers having a specific gravity of 1.30 to 1.36 $g/cm^3$ and a fineness of 0.5 to 2.2 dtex to produce flame resistant fiber felt having a moisture content of 20 to 60%;

step B: a step of heating and pressurizing the flame resistant fiber felt obtained in step A at a surface pressure of 2 to 10 MPa and at 240 to 300° C.; and step C: a step of carbonizing the flame resistant fiber felt pressurized in step B to produce carbon fiber felt.

[Step A]

Step A is a step of entangling, by water flow, flame resistant fibers having a specific gravity of 1.30 to 1.36 g/cm$^3$ and a fineness of 0.5 to 2.2 dtex to produce flame resistant fiber felt having a moisture content of 20 to 60%.

The flame resistant fibers are fibers that turn into carbon fibers by carbonization, that is, precursor fibers of carbon fibers. The flame resistant fibers being used in the present invention are not particularly limited. Examples thereof include polyacrylonitrile (PAN)-based fibers, pitch-based fibers, lignin-based fibers, polyacetylene-based fibers, polyethylene-based fibers, infusible fibers of these, polyvinyl alcohol-based fibers, cellulose-based fibers, and polybenzoxazole-based fibers. In particular, infusible PAN-based flame resistant fibers, which are highly tenacious and stretchable, and are easy to process, are preferable. As for the timing of infusibilizing the fibers, it is preferable to infusibilize the fibers before being formed into felt since it is easy to uniformly control the infusibilizing treatment.

When the specific gravity of the flame resistant fibers is in the range of 1.30 to 1.36 g/cm$^3$, the progress of flameproofing of the flame resistant fibers tends to be moderate. Therefore, the fibers are less likely to be broken or excessively deformed when heated and pressurized in step B described later, so that the number of the flat parts can be easily adjusted. If the specific gravity of the flame resistant fibers is less than 1.30 g/cm$^3$, it is difficult to make the flame resistant fibers into felt. The specific gravity of the flame resistant fibers is more preferably 1.31 to 1.35 g/cm$^3$, and still more preferably 1.32 to 1.34 g/cm$^3$. The specific gravity of the flame resistant fibers can be controlled according to the temperature and time of the infusibilizing treatment, and the specific gravity increases as the temperature and time increase. The specific gravity of the flame resistant fibers can be determined according to Method A described in JIS R 7603:1999.

When the fineness of the flame resistant fibers, that is, the weight of the flame resistant fibers per unit length (g/10000 m) is in the range of 0.5 to 2.2 dtex, the flame resistant fibers tend to have a moderate number of intersections. Therefore, the number of the flat parts can be easily adjusted when the flame resistant fiber felt is heated and pressurized in step B described later. If the fineness of the flame resistant fibers is less than 0.5 dtex, it is difficult to make the flame resistant fibers into felt. The fineness of the flame resistant fibers is more preferably 0.7 to 1.8 dtex, and still more preferably 0.9 to 1.4 dtex.

A detailed method for entangling the flame resistant fibers by water flow is not particularly limited, but it is preferable to subject the flame resistant fibers to a water jet treatment. In the water jet treatment, the flame resistant fibers arranged in a sheet shape, that is, a web is continuously conveyed by a conveyor or a cylinder, while water is continuously or intermittently injected toward the sheet from a plurality of nozzles arranged in a direction perpendicular to the web.

In the water jet treatment, it is preferable that water be injected in a columnar flow from the viewpoint of energy transmission efficiency. The columnar flow can be usually generated by ejecting water from a nozzle having a hole diameter (diameter) of 60 to 1000 μm at a pressure of 1 to 60 MPa. The hole diameter of the nozzle is preferably 105 μm or more, and more preferably 125 μm or more, because it is preferable that the nozzle have a larger hole diameter in order to push away the fibers in the plane direction. Meanwhile, when the nozzle has a small hole diameter, the amount of water can be reduced, and a smooth surface can be easily obtained. Therefore, the hole diameter of the nozzle is preferably 200 μm or less, and more preferably 180 μm or less.

The interval of nozzle holes is preferably 5 mm or less, more preferably 3 mm or less, and still more preferably 1 mm or less.

In addition, the amount of fibers that are pushed away in the plane direction upon application of the water flow to the fibers varies depending on the mesh size of the conveyor or cylinder holding the web. The larger the unevenness of the conveyor or cylinder surface is, the larger the displacement of the fibers is, and the smaller the unevenness is, the smaller the displacement is. The mesh size of the conveyor or cylinder is preferably 30 or more, more preferably 50 or more, and still more preferably 70 or more. The mesh size of the conveyor or cylinder is preferably 200 or less, more preferably 180 or less, and still more preferably 160 or less.

The water flow pressure in the water jet treatment can be appropriately selected according to the areal weight of the web to be treated, and it is preferable to set the water flow pressure to be higher as the areal weight is higher. The lower limit of the water flow pressure is preferably 10 MPa or more, and more preferably 15 MPa or more. The upper limit of the water flow pressure is preferably 40 MPa or less, and more preferably 35 MPa or less.

When the flame resistant fiber felt thus obtained through the entanglement by water flow has a moisture content in the range of 20 to 60%, the flame resistant fibers are plasticized upon being heated and pressurized in step B described later, and it is possible to form flat parts while maintaining the strength of the flame resistant fiber felt. If the moisture content is less than 20%, it is difficult to form flat parts because the plasticizing effect is not exerted. Meanwhile, if the moisture content is more than 60%, the temperature of the flame resistant fiber felt is less likely to increase in step B, so that long-time pressurization is required, leading to deterioration of productivity of the flame resistant fiber felt. Alternatively, when the moisture content of the flame resistant fiber felt is less than 60%, the moisture content of the surface of the flame resistant fiber felt is lower than that of the inside of the flame resistant fiber felt. Therefore, in step B, the surface of the flame resistant fiber felt is preferentially heated, and the flat parts are formed only at the surface of the flame resistant fiber felt, so that it is possible to form the flat parts while maintaining the strength of the flame resistant fiber felt.

The method for giving moisture during heating and pressurization in step B is not particularly limited, and for example, moisture can be given or impregnated by shower or spray. After that, the amount of moisture given can be adjusted by nipping with a mangle, drying with a heating roll or hot air, or the like.

[Step B]

Step B is a step of heating and pressurizing the flame resistant fiber felt obtained in step A at a surface pressure of 2 to 10 MPa and at 240 to 300° C.

The method for applying the surface pressure is not particularly limited, but calendering is preferable. When the surface pressure in this step is in the range of 2 to 10 MPa, it is easy to adjust the number of the flat parts. If the surface pressure is less than 2 MPa, it is difficult to form the flat parts. If the surface pressure is more than 10 MPa, the flame resistant fibers are deformed too large, and the strength of the flame resistant fiber felt decreases. The surface pressure is preferably 3 to 9 MPa, and more preferably 4 to 8 MPa.

When the heating temperature at the time of pressurization is in the range of 240 to 300° C., it is easy to adjust the number of the flat parts. If the heating temperature is less than 240° C., a high pressure is required to form the flat parts, so that the flame resistant fibers are deformed too large, and the strength of the flame resistant fiber felt decreases. If the heating temperature is more than 300° C., the flame resistant fibers are deformed at a high deformation speed and it is difficult to control the number of the flat parts, so that the flame resistant fiber felt has low strength due to a large number of flat parts. The heating temperature is preferably 245 to 280° C., and more preferably 250 to 260° C.

[Step C]

Step C is a step of carbonizing the flame resistant fiber felt pressurized in step B to produce carbon fiber felt. The carbonization method is not particularly limited, and may be a method publicly known in the field of carbon fiber materials. A preferable method is firing in an inert gas atmosphere. The carbonization by firing in an inert gas atmosphere is preferably carried out at 1000° C. or more with supply of an inert gas such as nitrogen or argon. The temperature for the firing is more preferably 1500° C. or more for easily achieving excellent electrical conductivity and thermal conductivity. Meanwhile, the temperature is preferably 2000° C. or less, and more preferably 1700° C. or less in consideration of the operation cost of the heating furnace.

[Step D]

In the case of obtaining a gas diffusion electrode medium having a microporous layer, as step D, a microporous layer is further formed on one surface of the carbon fiber felt obtained by the above-mentioned method.

The microporous layer may be formed by applying, to one surface of the carbon fiber felt, a carbon coating liquid containing the carbon particles and the water repellent material as described above. The carbon coating liquid containing the carbon particles may contain a dispersion medium such as water or an organic solvent, or may contain a dispersion aid such as a surfactant. The dispersion medium is preferably water, and the dispersion aid is more preferably a nonionic surfactant. Further, the carbon coating liquid may contain various carbon materials other than carbon particles, and a water repellent material.

As for a method for applying the carbon coating liquid to the carbon fiber felt, screen printing, rotary screen printing, spraying, intaglio printing, gravure printing, die coater coating, bar coating, blade coating or the like is employed.

Further, after the application of the carbon coating liquid to the carbon fiber felt, the carbon coating liquid is preferably dried at a temperature of 80 to 120° C. That is, the product after the application is placed in a dryer set at a temperature of 80 to 120° C., and dried for a period in the range of 5 to 30 minutes. The amount of drying air may be appropriately determined, but sudden drying is undesirable since it may induce fine cracks at the surface.

After step C, a water repellent material may be applied to the carbon fiber felt, and then step D may be performed. That is, a water repellent material may be applied to the carbon fiber felt after step C and before step D. However, it is preferable that step D be performed without application of the water repellent material to the carbon fiber felt after step C, because the fluorine/carbon element ratio at the surface on the microporous layer side tends to be larger than that at the other surface.

[Step E]

Further, the method preferably further includes step E of performing calendering after the formation of the microporous layer in step D. Calendering after the formation of the microporous layer improves the surface smoothness of the microporous layer. As a result, adhesion between the microporous layer and the catalyst layer is improved, thermal resistance between the catalyst layer and the gas diffusion electrode medium is reduced, dry out of the electrolyte membrane is reduced at a high temperature, and the cell performance is improved. The surface pressure in the calendering is not particularly limited, but is preferably in the range of 1 to 5 MPa. Calendering at a relatively low surface pressure of 1 to 5 MPa can improve the surface smoothness of the microporous layer without excessively crushing the pores in the microporous layer.

<Method for Producing Gas Diffusion Electrode>

A gas diffusion electrode can be formed by further providing a catalyst layer on the gas diffusion electrode medium obtained by the above-mentioned method. The catalyst layer can be formed by applying a catalyst slurry containing carbon particles carrying catalytic metal particles of platinum or an alloy thereof together with an electrolyte such as Nafion to the gas diffusion electrode medium by a printing method, a spray method, an ink jet method, a die coater method, a transfer method, or the like.

EXAMPLES

The data in examples and comparative examples were obtained in the following manner.

<Specific Gravity of Flame Resistant Fibers>

The specific gravity of the flame resistant fibers was measured according to Method A described in JIS R 7603: 1999 (N=3). A reagent used was ethanol (a special grade reagent manufactured by FUJIFILM Wako Pure Chemical Corporation) without purification. Flame resistant fibers weighing 1.0 to 1.5 g were collected and absolutely dried at 120° C. for 2 hours. The absolute dry weight (A) of the flame resistant fibers was measured, then the flame resistant fibers were impregnated in ethanol having a known specific gravity (specific gravity p), and the weight (B) of the flame resistant fiber bundle in ethanol was measured. The specific gravity was calculated according to the following formula.

$$\text{Specific gravity of flame resistant fibers} = (A \times p)/(A-B)$$

<Moisture Content of Flame Resistant Fiber Felt>

The weight (C) of the flame resistant fiber felt whose moisture content was adjusted in step A was measured, then the flame resistant fiber felt was absolutely dried at 120° C. for 2 hours, the absolute dry weight (D) was measured, and the moisture content was calculated according to the following formula.

$$\text{Moisture content of flame resistant fiber felt} = (C-D)/D \times 100$$

<Average Fiber Diameter of Carbon Fibers>

A surface of the carbon fiber felt was observed at a magnification of 100 with a scanning electron microscope (S-5500 manufactured by Hitachi, Ltd.) in 10 fields of view. The fiber diameters of the carbon fibers were measured at 9 points per field of view, and the "average fiber diameter" was determined from an average of fiber diameters at 90 points in total. The observation at 9 points per field of view was performed at the intersections of three lines vertically dividing one field of view into four and three lines horizontally dividing one field of view into four.

<Frequency of Flat Parts>

A surface of the carbon fiber felt was observed at a magnification of 100 with a scanning electron microscope (S-5500 manufactured by Hitachi, Ltd.) in 10 fields of view. The frequency of the flat parts was calculated by measuring the widths of carbon fibers in a direction orthogonal to the fiber axis direction of the carbon fibers in a plane view of the carbon fiber felt, counting the number of flat parts, in each of which the maximum value of the width is larger than the average fiber diameter by 10% or more and 50% or less, and dividing the number of the flat parts by the measurement area.

<Observation of Adhesion State of Graphite>

Photographs of a surface of the gas diffusion electrode medium opposite to the surface having the microporous layer (the opposite surface is referred to as "another surface") were taken in 10 fields of view at an observation magnification of 200 using S-5500 manufactured by Hitachi, Ltd. When graphite was observed in 7 or more fields of view, it was determined that graphite adhered.

<Glossiness>

The glossiness of the surface of the microporous layer was measured using a mobile specular glossiness measuring device "Gloss Mobile GM-1" (manufactured by Suga Test Instruments Co., Ltd.). The measurement standard is in accordance with Method 1 of JIS Z 8741:1997 "Specular glossiness-Methods of measurement". The glossiness was measured at 3 different points in the surface of the microporous layer, and the average of the numerical values obtained when the reflection angle was 85° was taken as the glossiness.

<Fluorine/Carbon Element Ratio (F/C)>

The fluorine/carbon element ratio was determined as follows. The fluorine/carbon element ratio was obtained by subjecting 10 points each at the surface of the gas diffusion electrode medium on the microporous layer side and the other surface of the gas diffusion electrode medium to scanning electron microscope (SEM)-EDX measurement under the conditions of an accelerating voltage of 20 kV and a magnification of 2000. The average of the values at the 10 points was adopted. The scanning electron microscope used was S-5500 manufactured by Hitachi, Ltd., and the energy dispersive X-ray analyzer used was EX-220SE manufactured by HORIBA, Ltd.

<Density>

As for the gas diffusion electrode medium, 10 test pieces each having a size of 10 cm×10 cm were produced, the weights of the test pieces were individually measured, and the average areal weight of the 10 test pieces was determined. In addition, the thicknesses of each of the test pieces in a state of being pressurized at a surface pressure of 0.15 MPa were measured at 9 points using a thickness gauge having a gauge head of 5 mm in diameter, and the average of the measured thicknesses was taken as the thickness of the test piece. Then, the average thickness of the 10 test pieces was calculated as the thickness of the gas diffusion electrode medium. In addition, the density was calculated from the average areal weight and the average thickness.

<Thermal Conductivity>

A test piece of the gas diffusion electrode medium having a diameter of 30 mm was placed in a thermal conductivity meter and pressurized at a surface pressure of 1 MPa, and the thermal conductivity was measured. The thermal conductivity meter used was IE-1230 manufactured by Iwatsu Test Instruments Corp.

<Cell Performance>

To both surfaces of a fluorine-based electrolyte membrane Nafion XL (manufactured by DuPont), a catalyst layer formed of platinum-supported carbon and Nafion (the amount of platinum in the layer was 0.4 mg/cm$^2$) was bonded by hot pressing to produce a catalyst layer-coated electrolyte membrane (catalyst coated membrane, CCM). The gas diffusion electrode medium produced in each of the examples and the comparative examples was disposed on both surfaces of the CCM, and hot pressing was performed again to form a membrane electrode assembly (MEA). The MEA having a gasket (having a thickness 80% of the thickness of the gas diffusion electrode medium) around the gas diffusion electrode media was set in a single cell (25 cm$^2$, serpentine flow channel). In this process, the gas diffusion electrode medium was set so that the surfaces on the microporous layer side might face the CCM.

Electric power was generated at a cell temperature of 90° C., dew points of hydrogen and air of 60° C., flow rates of hydrogen and air of 1000 cc/min and 2500 cc/min, respectively, and a current density of 1.8 A/cm$^2$ with the gas exit being open (no pressurization), and the voltage at that time was regarded as the voltage under high-temperature and low-humidity conditions.

Example 1

Crimped yarns of PAN-based flame resistant fibers having a specific gravity of 1.33 g/cm$^3$ and a fineness of 1.35 dtex were cut to have a number average fiber length of 51 mm, and then formed into a web by carding and cross-layering. Then, front and back sides of the web were alternately subjected to a water jet treatment (4 times in total) at a treatment speed of 10 m/min and an injection pressure of 20 MPa using a nozzle plate having holes each having a diameter of 0.14 mm arranged at an interval of 0.8 mm, and then the web was dried so that the web might have a moisture content of 45%. The obtained flame resistant fiber felt was calendered under the conditions of a surface pressure of 5 MPa and 255° C. Then, the flame resistant fiber felt was carbonization by firing at 1600° C. for 1 hour in an inert atmosphere to produce carbon fiber felt.

A microporous layer was applied to the carbon fiber felt thus produced. First, a carbon coating liquid was prepared from a mixture of acetylene black ("DENKA BLACK" (registered trademark) manufactured by Denki Kagaku Kogyo Co., Ltd.), graphite ("UP-5N" (average particle size: 7 μm, average thickness: 0.050 μm) manufactured by Nippon Graphite Industries, Co., Ltd.), a PTFE resin ("POLYFLON" (registered trademark) D-1E manufactured by DAIKIN INDUSTRIES, LTD.), a surfactant ("TRITON" (registered trademark) X-100 manufactured by NACALAI TESQUE, INC.), and pure water at a ratio of 4.4 parts by mass/3.3 parts by mass/2.5 parts by mass/14 parts by mass/75.6 parts by mass. Then, the carbon coating liquid was applied with a die coater to the carbon fiber felt, heated and dried at 120° C. for 10 minutes, and sintered at 380° C. for 10 minutes.

Then, the carbon fiber felt on which the microporous layer was formed as described above was calendered at a surface pressure of 2 MPa to produce a gas diffusion electrode medium.

Example 2

A gas diffusion electrode medium was obtained in the same manner as in Example 1 except that the fineness of the flame resistant fibers was changed to 2.15 dtex.

Example 3

A gas diffusion electrode medium was obtained in the same manner as in Example 2 except that graphite in the microporous layer was changed to acetylene black, and that calendering after the application of the microporous layer was not performed.

Example 4

A gas diffusion electrode medium was obtained in the same manner as in Example 3 except that the moisture content of the flame resistant fiber felt was 25%.

Example 5

A gas diffusion electrode medium was obtained in the same manner as in Example 3 except that the moisture content of the flame resistant fiber felt was 58%.

Example 6

A gas diffusion electrode medium was obtained in the same manner as in Example 2 except that the surface pressure at the time the flame resistant fiber felt was calendered in step B was changed to 2.5 MPa.

Comparative Example 1

A gas diffusion electrode medium was obtained in the same manner as in Example 3 except that the specific gravity of the flame resistant fibers was changed to 1.38 g/cm$^3$. Since the specific gravity of the flame resistant fibers was higher, the number of the flat parts was small. As a result of evaluating power generation, dry out occurred, and no voltage was obtained.

Comparative Example 2

A gas diffusion electrode medium was obtained in the same manner as in Example 3 except that the moisture content of the flame resistant fiber felt was 100%. The fibers were greatly deformed by calendering of the flame resistant fibers (step B) to form a structure having a high density also at the inside of the felt, so that gas diffusivity and cell performance were deteriorated.

Comparative Example 3

A gas diffusion electrode medium was obtained in the same manner as in Example 3 except that the moisture content of the flame resistant fiber felt was 15%, and that the surface pressure and temperature in step B were changed to 25 MPa and 310° C., respectively. The gas diffusion electrode medium had slightly high density, few flat parts, and low thermal conductivity. As a result of evaluating power generation, dry out occurred, and no voltage was obtained.

The configurations and physical properties of the gas diffusion electrode media produced in the examples and the comparative examples, and the cell performance of polymer electrolyte fuel cells including the gas diffusion electrode media are shown in Table 1.

TABLE 1

|  |  |  | Unit | Example 1 | Example 2 | Example 3 | Example 4 | Example 5 |
|---|---|---|---|---|---|---|---|---|
| Step A | Flame resistant fibers | Specific gravity | g/cm$^3$ | 1.33 | 1.33 | 1.33 | 1.33 | 1.33 |
|  |  | Fineness | dtex | 1.35 | 2.15 | 2.15 | 2.15 | 2.15 |
|  |  | Moisture content | % | 45 | 45 | 45 | 25 | 58 |
| Step B |  | Surface pressure | MPa | 5 | 5 | 5 | 5 | 5 |
|  |  | Temperature | ° C. | 255 | 255 | 255 | 255 | 255 |
| Step D | Addition of graphite |  | Yes/No | Yes | Yes | No | No | No |
| Step E | Calendering |  | — | Yes | Yes | No | No | No |
| Gas diffusion electrode medium | Surface on microporous layer side | Glossiness | Degree | 41 | 38 | 19 | 15 | 28 |
|  |  | F/C |  | 0.125 | 0.125 | 0.125 | 0.125 | 0.125 |
|  | The other surface |  |  | 0.050 | 0.050 | 0.050 | 0.050 | 0.050 |
|  |  | Graphite adhered | Yes/No | Yes | Yes | No | No | No |
|  |  | Average fiber diameter | µm | 8.0 | 10.0 | 10.0 | 10.0 | 11.0 |
|  |  | Flat parts | number/mm$^2$ | 180 | 105 | 100 | 60 | 190 |
|  | Density |  | g/cm$^3$ | 0.55 | 0.45 | 0.45 | 0.31 | 0.75 |
|  | Thermal conductivity |  | W/(m · K) | 0.65 | 0.48 | 0.40 | 0.30 | 0.60 |
|  | Cell performance |  | V | 0.45 | 0.43 | 0.4 | 0.39 | 0.39 |

|  |  |  | Unit | Example 6 | Comparative Example 1 | Comparative Example 2 | Comparative Example 3 |
|---|---|---|---|---|---|---|---|
| Step A | Flame resistant fibers | Specific gravity | g/cm$^3$ | 1.33 | 1.38 | 1.33 | 1.33 |
|  |  | Fineness | dtex | 2.15 | 2.15 | 2.15 | 2.15 |
|  |  | Moisture content | % | 45 | 45 | 100 | 15 |
| Step B |  | Surface pressure | MPa | 2.5 | 5 | 5 | 25 |
|  |  | Temperature | ° C. | 255 | 255 | 255 | 310 |
| Step D | Addition of graphite |  | Yes/No | Yes | No | No | No |
| Step E | Calendering |  | — | Yes | No | No | No |
| Gas diffusion electrode medium | Surface on microporous layer side | Glossiness | Degree | 36 | 15 | 29 | 19 |
|  |  | F/C |  | 0.125 | 0.125 | 0.125 | 0.125 |
|  | The other surface |  |  | 0.050 | 0.050 | 0.050 | 0.050 |
|  |  | Graphite adhered | Yes/No | Yes | No | No | No |

TABLE 1-continued

|  |  |  |  |  |  |  |
|---|---|---|---|---|---|---|
|  | Average fiber diameter | μm | 10.0 | 9.9 | 13.0 | 12.0 |
|  | Flat parts | number/mm² | 55 | 5 | 300 | 10 |
| Density |  | g/cm³ | 0.40 | 0.29 | 0.85 | 0.45 |
| Thermal conductivity |  | W/(m·K) | 0.35 | 0.06 | 0.70 | 0.18 |
| Cell performance |  | V | 0.43 | 0 | 0.20 | 0 |

The invention claimed is:

1. A gas diffusion electrode medium comprising carbon fiber felt including carbon fibers having an average fiber diameter of 5 to 20 μm, wherein at least a part of the carbon fibers that constitute the carbon fiber felt have a flat part in which, in a plane view of a surface of the carbon fiber felt, a maximum value of a fiber diameter is observed to be 10 to 50% larger than the average fiber diameter, and a frequency of the flat parts at the surface of the carbon fiber felt is 50 to 200/mm².

2. The gas diffusion electrode medium according to claim 1, wherein the carbon fiber felt contains graphite.

3. The gas diffusion electrode medium according to claim 1, having a thermal conductivity of 0.25 to 10 W/(m·K).

4. The gas diffusion electrode medium according to claim 1, having a density of 0.3 to 0.8 g/cm³.

5. The gas diffusion electrode medium according to claim 1, comprising a microporous layer provided on one surface of the carbon fiber felt, wherein the carbon fibers having the flat parts are observed in a plane view of another surface of the carbon fiber felt.

6. The gas diffusion electrode medium according to claim 5, having a fluorine/carbon element ratio of 0.10 to 0.15 at a surface of the gas diffusion electrode medium on a microporous layer side, and a fluorine/carbon element ratio of less than 0.10 at another surface of the gas diffusion electrode medium.

7. The gas diffusion electrode medium according to claim 5, wherein a surface of the microporous layer has a glossiness of 31 degrees or more.

8. A method for producing a gas diffusion electrode medium, the method comprising:
step A: a step of entangling, by water flow, flame resistant fibers having a specific gravity of 1.30 to 1.36 g/cm³ and a fineness of 0.5 to 2.2 dtex to produce flame resistant fiber felt having a moisture content of 20 to 60%;
step B: a step of heating and pressurizing the flame resistant fiber felt obtained in step A at a surface pressure of 2 to 10 MPa and at 240 to 300° C.; and
step C: a step of carbonizing the flame resistant fiber felt pressurized in step B to produce carbon fiber felt.

9. The production method according to claim 8, wherein in step B, the pressurization is performed by calendering.

10. The production method according to claim 8, wherein in step C, a heating temperature in the carbonization is 2000° C. or less.

11. The production method according to claim 8, further comprising:
step D: a step of forming a microporous layer on one surface of the carbon fiber felt after step C.

12. The production method according to claim 11, further comprising:
step E: a step of performing calendering after step D.

13. A gas diffusion electrode comprising:
the gas diffusion electrode medium according to claim 1; and
a catalyst layer provided on a surface of the gas diffusion electrode medium.

14. A membrane electrode assembly comprising:
a polymer electrolyte membrane;
a catalyst layer; and
the gas diffusion electrode medium according to claim 1.

15. A polymer electrolyte fuel cell comprising the membrane electrode assembly according to claim 14.

* * * * *